United States Patent
Byron et al.

(10) Patent No.: US 10,984,442 B2
(45) Date of Patent: Apr. 20, 2021

(54) COGNITIVE ADVERTISING TRIGGERED BY WEATHER DATA

(71) Applicant: International Business Machines Corporation, Armonk, NY (US)

(72) Inventors: Donna K. Byron, Petersham, MA (US); Carmine M. DiMascio, West Roxbury, MA (US); Brian Hull, Brooklyn, NY (US); Florian Pinel, New York, NY (US); Robert N. Redmond, Jr., Smyrna, GA (US); Edward E. Seabolt, Georgetown, TX (US); William S. Spann, III, Atlanta, GA (US); Domenic A. Venuto, Brooklyn, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

(21) Appl. No.: 15/791,648

(22) Filed: Oct. 24, 2017

(65) Prior Publication Data
US 2018/0341979 A1    Nov. 29, 2018

Related U.S. Application Data

(63) Continuation of application No. 15/602,231, filed on May 23, 2017.

(51) Int. Cl.
*G06Q 30/02*    (2012.01)

(52) U.S. Cl.
CPC ..... *G06Q 30/0245* (2013.01); *G06Q 30/0261* (2013.01); *G06Q 30/0277* (2013.01)

(58) Field of Classification Search
None
See application file for complete search history.

(56) References Cited

U.S. PATENT DOCUMENTS

| 9,475,683 B2 | 10/2016 | Givens et al. |
| 2008/0228600 A1* | 9/2008 | Treyz ..................... H04W 4/24 705/26.43 |

(Continued)

FOREIGN PATENT DOCUMENTS

| CN | 106096993 A | 11/2016 |
| EP | 1384951 A1 | 1/2004 |

(Continued)

OTHER PUBLICATIONS

Freyne and Berkovsky, "Intelligent Food Planning: Personalized Recipe Recommendation", 2010, Proceedings of the 15th International Conference on Intelligent User Interfaces ACM, 4 pages (Year: 2010).*

(Continued)

*Primary Examiner* — John Van Bramer

(74) *Attorney, Agent, or Firm* — Cantor Colburn LLP; Reza Sarbakhsh

(57) ABSTRACT

Aspects of the invention include receiving, at a processing system, weather data that is associated with a target consumer. Content of a digital advertisement for a vendor is selected based at least in part on the weather data that is associated with the target consumer, and information about an item or a service provided by the vendor. The digital advertisement, including the content, is transmitted for presentation to the target consumer via a user interface. A response to the digital advertisement is received from the target consumer. The content of the digital advertisement is modified based at least in part on the response to the digital (Continued)

advertisement from the target consumer. The digital advertisement, including the modified content, is transmitted for presentation to the target consumer via the user interface.

5 Claims, 11 Drawing Sheets

(56) References Cited

U.S. PATENT DOCUMENTS

| | | |
|---|---|---|
| 2009/0065570 A1 | 3/2009 | Peters et al. |
| 2009/0234664 A1 | 9/2009 | Schaffnit et al. |
| 2011/0112904 A1 | 5/2011 | Stupp |
| 2011/0288917 A1* | 11/2011 | Wanek ............... G06Q 30/0252 705/14.5 |
| 2012/0083669 A1 | 4/2012 | Abujbara |
| 2012/0156344 A1 | 6/2012 | Studor et al. |
| 2012/0233238 A1 | 9/2012 | Braginsky et al. |
| 2013/0006802 A1 | 1/2013 | Dillahunt et al. |
| 2013/0024471 A1 | 1/2013 | Mitrovic |
| 2014/0067395 A1* | 3/2014 | Balasubramanian ........................ G06Q 30/0255 704/251 |
| 2014/0358423 A1 | 12/2014 | Thiele et al. |
| 2015/0046877 A1 | 2/2015 | Cuppari et al. |
| 2015/0332340 A1* | 11/2015 | Brown ............... G06Q 30/0269 705/14.66 |
| 2015/0379981 A1* | 12/2015 | Balasubramanian ........................ G06Q 30/0255 704/260 |
| 2016/0353235 A1 | 12/2016 | Williams et al. |

FOREIGN PATENT DOCUMENTS

| | | |
|---|---|---|
| JP | 2012113544 A | 6/2012 |
| WO | 2013090743 A2 | 6/2013 |
| WO | 2014144904 A1 | 9/2014 |

OTHER PUBLICATIONS

Donna K. Byron, et al. Pending U.S. Appl. No. 15/602,231 entitled "Cognitive Advertising Triggered by Weather Data," filed with the U.S. Patent and Trademark Office on May 23, 2017.

List of IBM Patents or Patent Applictions Treated as Related; (Appendix P), Filed Oct. 24, 2017, 2 pages.

Freyne, Jill, et al; "Intelligent food planning: personalized recipe recommendation." Proceedings of the 15th International conference on Intelligent user interfaces. ACM,2010, 4 pages.

* cited by examiner

US 10,984,442 B2

COGNITIVE ADVERTISING TRIGGERED BY WEATHER DATA

DOMESTIC PRIORITY

This application is a continuation of U.S. patent application Ser. No. 15/602,231, filed May 23, 2017, the content of which is incorporated by reference herein in its entirety.

BACKGROUND

Embodiments of the invention relate in general to advertising, and more specifically to cognitive advertising that is triggered by weather data.

SUMMARY

Embodiments of the invention include methods, systems, and computer program products for implementing cognitive advertising that is triggered by weather data. A non-limiting example method includes receiving, at a processing system, weather data that is associated with a target consumer. Content of a digital advertisement for a vendor is selected based at least in part on the weather data that is associated with the target consumer, and information about an item or a service provided by the vendor. The digital advertisement, including the content, is transmitted for presentation to the target consumer via a user interface. A response to the digital advertisement is received from the target consumer. The content of the digital advertisement is modified based at least in part on the response to the digital advertisement from the target consumer. The digital advertisement, including the modified content, is transmitted for presentation to the target consumer via the user interface.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
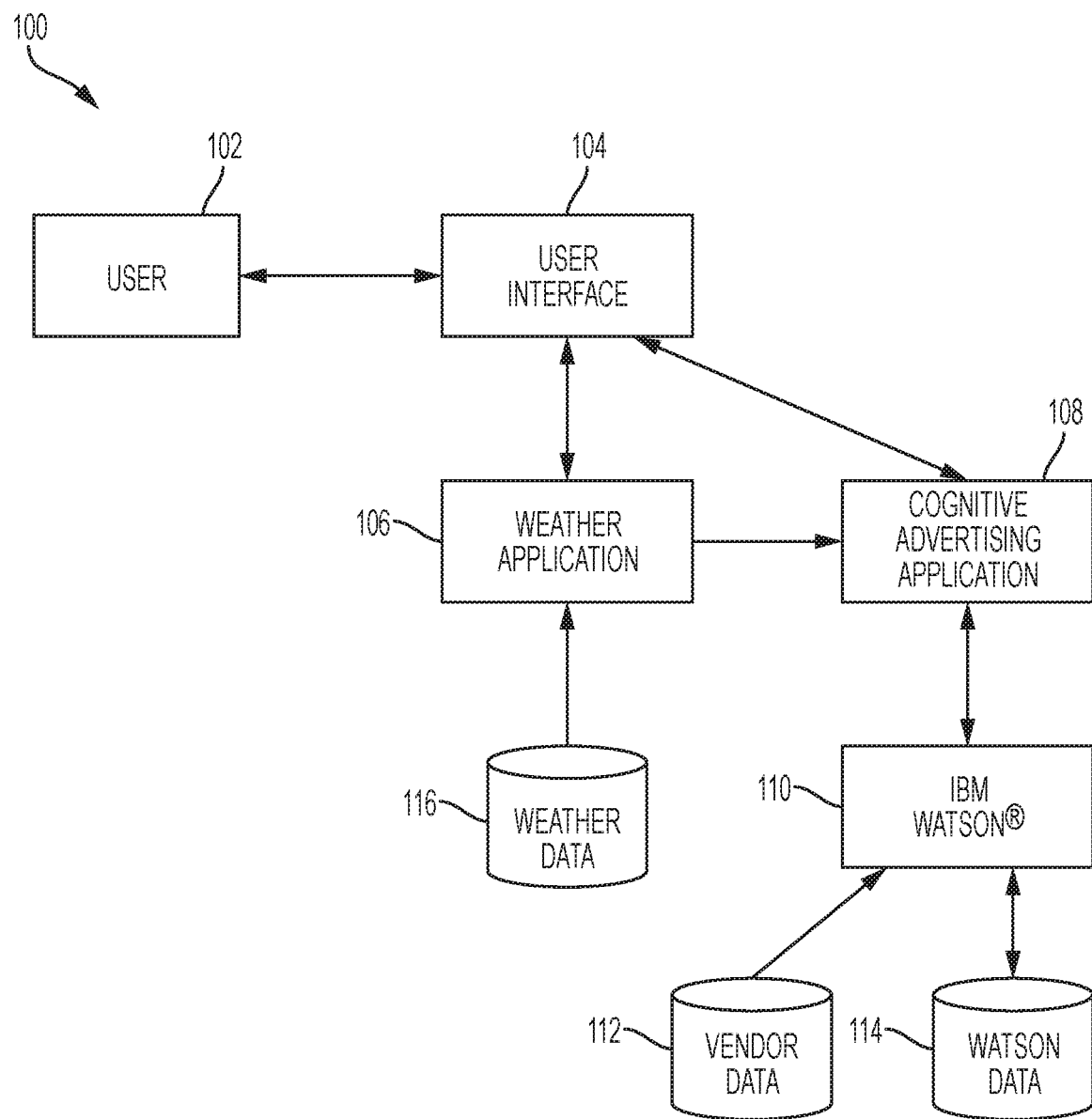
FIG. 1 is a block diagram of a system for implementing cognitive advertising that is triggered by weather data in accordance with one or more embodiments of the invention.

One or more embodiments of the invention described herein provide cognitive advertising which includes the ability for a target consumer to receive relevant information about products or offerings of an advertiser by interacting with a question answering computer system, such as IBM Watson®. IBM Watson can understand natural language, reason, learn and interact with humans and is utilized by one or more embodiments of the invention described herein to create a highly interactive user experience that is based on a marketing campaign's purpose but with true contextual relevance for a target consumer. In accordance with one or more embodiments of the invention, the relevant information to be included in an advertisement (also referred to herein as an "ad") is selected based at least in part on weather data associated with a target consumer. For example, if the target consumer is at a location where it is currently snowing, the advertisement can mention the snow and suggest a food or drink recipe that is typically consumed during snow events (or cold weather) such as hot chocolate or soup. The information about the weather data can be received from a weather data source that tracks and predicts weather conditions at geographic locations, such as data generated by The Weather Company.

Artificial intelligence, machine learning, cognitive computing are all examples of technology advancements that are transforming the media business. In accordance with one or more embodiments of the invention described herein, weather and location data can be used to trigger advertisements to the right consumer at the right time. This can result in custom strategies that drive brand metrics and increased sales. In addition, advanced technology solutions can be built into the ad creative itself for more personalized and valuable interactions. The ad creative can include the media elements presented to manifest the advertisement such as, but not limited to graphics, photos, scenes, and audio. These elements can be modified by incorporating a specific image selected by decision logic triggered by the context, for example, a street view with pedestrians might show rain falling. For advertisers, consumer and product insights can be uncovered faster than ever before, revealing connections previously not visible to data scientists. For the user, or target consumer, the use of one or more embodiments of the invention described herein can deepen the relationship with the brand(s) of the vendor by providing, for example, personalized recipe recommendations that range from simple standards to entirely new, interesting and surprising dishes and ingredient combinations that can drive insights, sales, advocacy, and buzz. As used herein the term recipe refers to recipes for food and/or drinks.

In accordance with more embodiments of the invention described herein, data and processing capabilities of a weather data source, such as The Weather Company, and a recipe generator, such as Chef Watson™, are paired together along with a food brand(s) being advertised to generate recipe recommendations for a target consumer. Chef Watson, a product available from IBM, has analyzed thousands of recipes to understand how ingredients are used in different dishes, commonly paired ingredients, and varying cooking styles. In accordance with one or more embodiments of the invention described herein, recipe recommendations that include ingredients sold by the food brand(s) being advertised are selected for a target consumer based at least in part on weather data associated with the target consumer. Additional recipe selection criteria can be further based at least in part on the time of day, a geographic location of the user, and/or preferences specified by the user (e.g., the target consumer).

In accordance with one or more embodiments of the invention described herein, data and processing capabilities of a weather data source, such as the Weather Company, and a drink recipe generator, such as Watson Twist from IBM, are paired together along with a beverage brand(s) being advertised to generate drink recipe recommendations for a target consumer. The drink recipe recommendations are selected based at least in part on weather data associated with the target consumer and on an ingredient(s) of the recommended drink recipe(s) being available from the drink brand(s) being advertised. Additional drink recipe selection criteria can include time of day, geographic location of the user, and/or preferences specified by the user (e.g., the target consumer).

In accordance with one or more embodiments of the invention described herein, data and processing capabilities of a weather data source, such as The Weather Company, and a question answering system, such as IBM Watson, are paired together with a dining or entertainment brand(s) being advertised to generate suggestions for a target consumer. The suggestions are selected based at least in part on weather data associated with the target consumer and on options provided by the entertainment brand(s) being advertised. Additional suggestion selection criteria can include time of day, geographic location of the user, and/or preferences specified by the user (e.g., target consumer).

By taking advantage of the ability of IBM Watson to understand natural language to interact with humans as well as its ability to reason and learn, one or more embodiments of the invention described herein provide more personalized digital advertising user experiences when compared with contemporary digital advertising approaches which have a defined script. In addition, data related to the two-way interactions between a target consumer and the digital advertising platform can be saved and used for example, by an advertiser for market analysis. As used herein, the term "digital advertisement" refers to an advertisement for a product or service that is delivered through email, social media websites, online advertising on search engines, banner ads on mobile or Web sites and affiliate programs.

One or more embodiments of the invention described herein provide cognitive advertising that is triggered by weather data to provide real-time, personalized product or service recommendations to target consumers. By utilizing the ability to obtain weather data about a target consumer, using for example applications and data from The Weather Company, the cognitive advertising can be tailored to individual target consumers and provide them assistance in narrowing down their selections.

Turning now to FIG. 1, a block diagram 100 of a system for implementing cognitive advertising that is triggered by weather data is generally shown in accordance with one or more embodiments of the invention. The system shown in FIG. 1 includes a user 102 (also referred to herein as a "target consumer") interacting with a user interface 104. The user interface 104 can be implemented by computer instructions located on any computer used by the user 102 including a mobile computing device (e.g., a cellular phone) or a stationary device (e.g., a desktop computer, a television monitor). As used herein, the term "user interface" refers to any type of interface for providing communication between the user 102 and a computer implemented application. Examples of types of user interfaces that may be utilized include, but are not limited to voice (e.g., via speakers, microphones), display screens (e.g., touch, text, graphical user interface), and haptic interfaces (e.g., vibrators, accelerometers).

In accordance with one or more embodiments of the invention, the user interface 104 shown in FIG. 1 is created by a cognitive advertising application 108 and is presented to the user 102 as all or a portion of a user interface of an existing weather application 106, such as The Weather Channel application from The Weather Company. For example, the ad placement platform SWVL from The Weather Company can be utilized by one or more embodiments of the invention. SWVL is a contextually triggered ad placement platform that allows advertisers to create multiple versions of an ad, and to define triggers that the SWVL backend logic chooses among the multiple versions to orchestrate a combination of frontend design elements based on weather, location, and other relevance judgements and attributes local to the user. The SWVL display technology also includes multiple links to external tools such as social sharing integrated right within the ad to encourage user engagement. Ads can be displayed within mobile device interface platforms or web browsers, either on a desktop or mobile device. Ads are rendered in a container layer by the frontend technology, such as in a hypertext markup language (HTML) iframe, and they respond to user actions to activate additional features via Javascript and cascading style sheets (CSS), or other user interface (UI) specification languages. In a mobile view, the UI elements might be configured using a library such as mobile rich media ad interface definitions (MRAID).

In accordance with one or more embodiments of the invention, cognitive advertising (also referred to herein as "cognitive ad") services can be integrated into the suite of SWVL design components by modifying SWVL to provide: user controls for entering natural language text and spoken voice input, calling from the ad to backend cognitive services that disambiguate the user's input and perform actions requested by the user (e.g., surfacing food combinations that comply with the user's search words), and maintaining the session position in a dialogue state space so that the user can have multi-turn interactions with the backend cognitive agent. In addition, unlike other advertising presentation tools, the cognitive agent utilized by one or more embodiments of the invention can prompt the user for particular inputs, thus capturing user responses of interest to the brand for their own analytics.

One or more embodiments of the invention can run within a wide range of weather applications 106 provided that the application within which it is embedded can provide or access contextual features needed to trigger specific advertisements or versions of advertisements. Example weather applications 106 include, but are not limited to: seasonal allergy trackers, travel advisors or hospitality applications linked to specific hotels or sites, location-specific applications such as a visitor portal to a national park, transportation-specific applications that might have a link to weather information such as flight status, and social media applications.

The weather application 106 shown in FIG. 1 also includes an interface to weather data 116 that is used by the cognitive advertising application 108 to select products or services to suggest to the user 102. The cognitive advertising application 108 can request the weather data 116 from the weather application 106 as shown in FIG. 1, or the cognitive advertising application 108 can access the weather data 116 directly (not shown in FIG. 1). As used herein the term "weather data" refers to any data related to weather conditions such as but not limited to: temperature, wind speed, tides, precipitation, sun rise/set, moon phase, cloud coverage, pollen count, and humidity. As used herein the term "weather data associated with a target consumer" can refer to, but is not limited to: a current or forecasted or past weather condition at the current geographic location of the target consumer; and a current or forecasted or past weather condition at a past or expected future location of the target consumer.

As shown in FIG. 1, the user interface 104 is generated by the cognitive advertising application 108 using weather data 116 and data from IBM Watson 110. As shown in FIG. 1, Watson data 114 which contains data typically used by IBM Watson is augmented with vendor data 112 that pertains to the advertiser, or vendor. The vendor data 112 can include information about the products or services being advertised including, but not limited to descriptive information and graphics, recipes that utilize products offered by the advertiser, weather conditions where use of the recipe and/or product can be suggested, and geographic locations where use of the recipe and/or product can be suggested. In cases where the vendor is providing a service (e.g., a restaurant, an amusement park), the vendor data 112 can include data related to the service such as, but not limited to descriptive information and graphics, geographic location of the service, holidays or time frames where using the service can be suggested, and weather conditions where using the service can be suggested.

In accordance with one or more embodiments of the invention, vendor data 112 is integrated in two phases. During the training phase, IBM Watson 110 is trained to identify the vendor's products and IBM Watson's training data is focused on the vendor's products. For a food manufacturer, the manufacturer's products are added to the ingredient database and a corpus of recipes that use the manufacturer's products is ingested. During the second phase, runtime, vendor data 112 can take the form of additional constraints that are added to the user inputs sent to IBM Watson 110. For example, if a user requests a soup recipe, constraints are added to force IBM Watson 110 to create a soup recipe with at least one product from the advertising manufacturer.

In accordance with one or more embodiments of the invention, all or a portion of the user interface 104, the weather application 106, the weather data 116, the cognitive advertising application 108, IBM Watson 110, the vendor data 112, and the Watson data 114 are communicatively coupled as shown in FIG. 1 via one or more networks.

Figure 2:
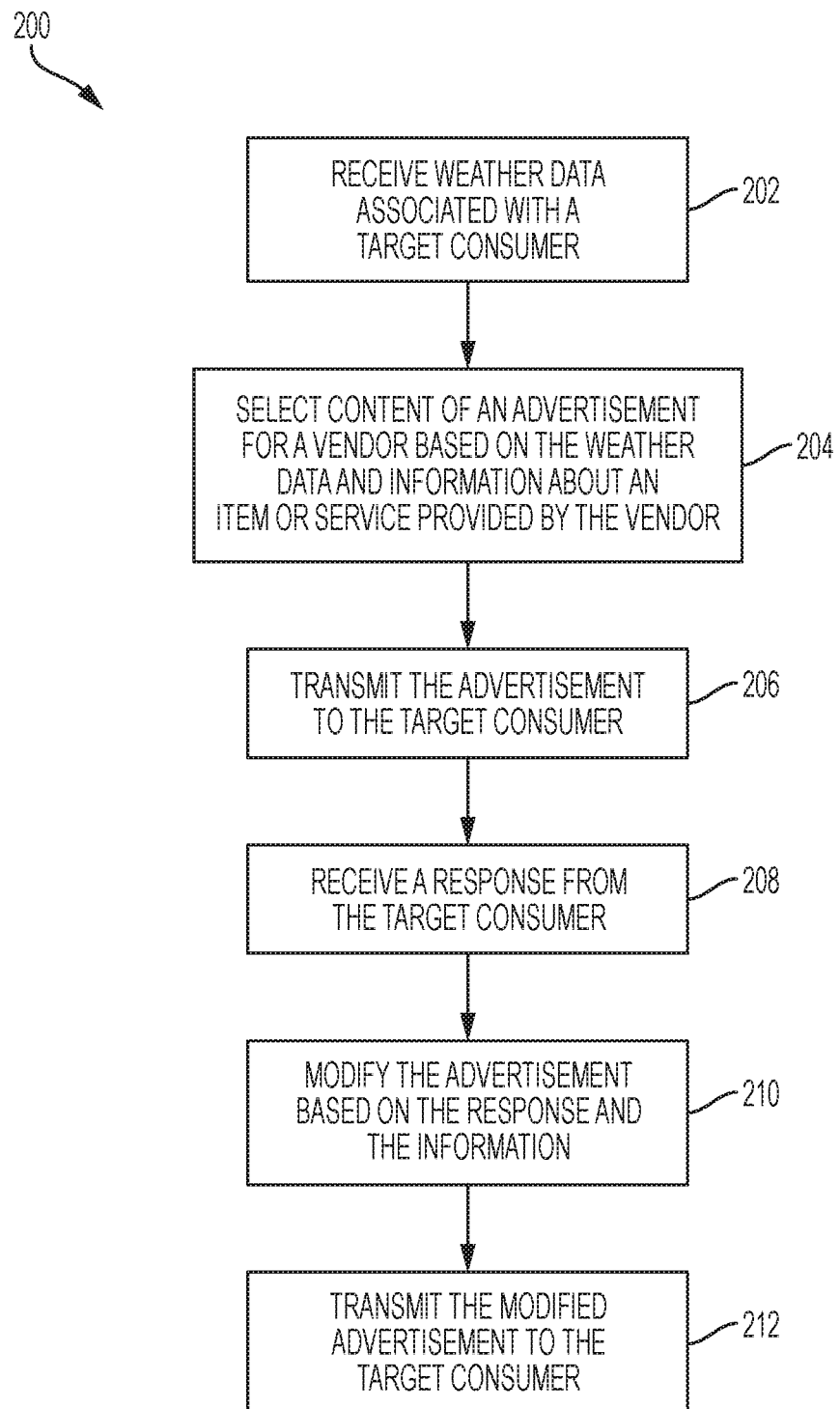
FIG. 2 is flow diagram of a process for cognitive advertising that is triggered by weather data in accordance with one or more embodiments of the invention.

Turning now to FIG. 2, a flow diagram 200 of a process for cognitive advertising that is triggered by weather data is generally shown in accordance with one or more embodiments of the invention. The processing shown in FIG. 2 can be performed, for example, by the cognitive advertising application 108 shown in FIG. 1. Referring to the processing shown in FIG. 2, at block 202, weather data associated with a target consumer is received. A block 204, the content of a digital advertisement for a product(s) (e.g., an edible product such as a food or beverage) or a service(s) (e.g., a restaurant, a gas station, a movie theater) of a vendor is selected based at least in part on the weather data associated with the target consumer and information about the product or service provided by the vendor. The selection can be further based at least in part on a current location of the target consumer, a current time of day, and/or preferences of the target consumer (e.g., specified by the target consumer or inferred based on past actions of the target consumer).

In accordance with one or more embodiments of the invention, the selecting is performed by a question and answering system, such as IBM Watson, where cognitive backend services are trained to produce output based on complex combinations of input features. In a cognitive ad, the input features may contain for example the user's location, the current weather conditions at that location, and a request from the user in natural language such as "help me make a soup recipe with coconut." The cognitive process decides how to produce output with this combination depending on the machine learning model that was built during training. The output might vary for example in the way selected possible recipes are ranked, in the way ingredients are selected for inclusion in the recipes based on the season or current weather conditions, and/or in the phrasing of the output dialog turn produced by the agent (such as stating that "it's cold outside so here are some great hearty soup recipes" vs. "it's a hot day so I created some great cold soup recipes for you").

At block 206, the digital advertisement, including the selected content is transmitted for presentation to the target consumer via a user interface. At block 208, a response to the transmitted digital advertisement is received from the target consumer. In accordance with one or embodiments of the invention, the response is generated and received via the user interface. At block 210, content of the digital advertisement is modified based at least in part on the response to the digital advertisement from the target consumer. The modifying of the content block 210 can be performed in a manner that is similar to the selecting of the content described above with respect to block 204. At block 212, the digital advertisement, including the modified content is transmitted for presentation to the target consumer via a user interface. Blocks 208, 210, and 212 can be repeated until the digital advertisement is closed (e.g., by the target consumer exiting the advertisement, by the application where the advertisement is appearing closing).

In accordance with one or more embodiments of the invention, when the item or service is an item (also referred to herein as "a product") that is edible (e.g., a food or a beverage), the digital advertisement includes a recipe that includes the item as an ingredient. As described below in more detail, the recipe can be a recipe for a meal or for a beverage. The recipe presented to the target consumer can be provided by the vendor as part of the vendor data or the recipe can be generated in real-time by a processor using IBM Watson. In accordance with one or more embodiments of the invention, when the item or service is a service (e.g., a restaurant) the digital advertisement includes information about the service (e.g., a menu or daily specials).

In accordance with one or more embodiments of the invention, data related to the responses to the digital advertisement, including the flow and content of interactions with the target consumer, are stored and provided to the vendor for analysis. This data can be used to uncover consumer and product insights as an aid in driving product creation by allowing the vendor to better understand, based on the interactive experience or "conversation" between the cognitive advertising application and the target consumer, what the target consumer is looking for in the product or future products. The response data can also be used as focus group data, for example when the geographic location of the target consumer is known. The focus group data can broken down into different regions or nations or based on other known characteristics of the target consumers who were presented with the digital advertisements. The response data can further be used to drive product placement based for example on analyzing focus group data to determine preferences in different geographic locations (e.g., west coast, northeast). The data related to the responses, or conversations, can also be used to better understand brand perception and favorability. In addition, tone and intent of the target consumer responses can be inferred using IBM Watson.

In accordance with one or more embodiments of the invention, the analytics performed by IBM Watson (or specifically IBM Twist or Chef Watson) can be modified by the conversations that take place between the vendor and the target consumer as part of the cognitive advertising process described herein. Analysis can be conducted on the collected data and used to generate further insights to understand things like flavor combinations that users have selected, ingredient trends, and overall product information.

Figure 3:
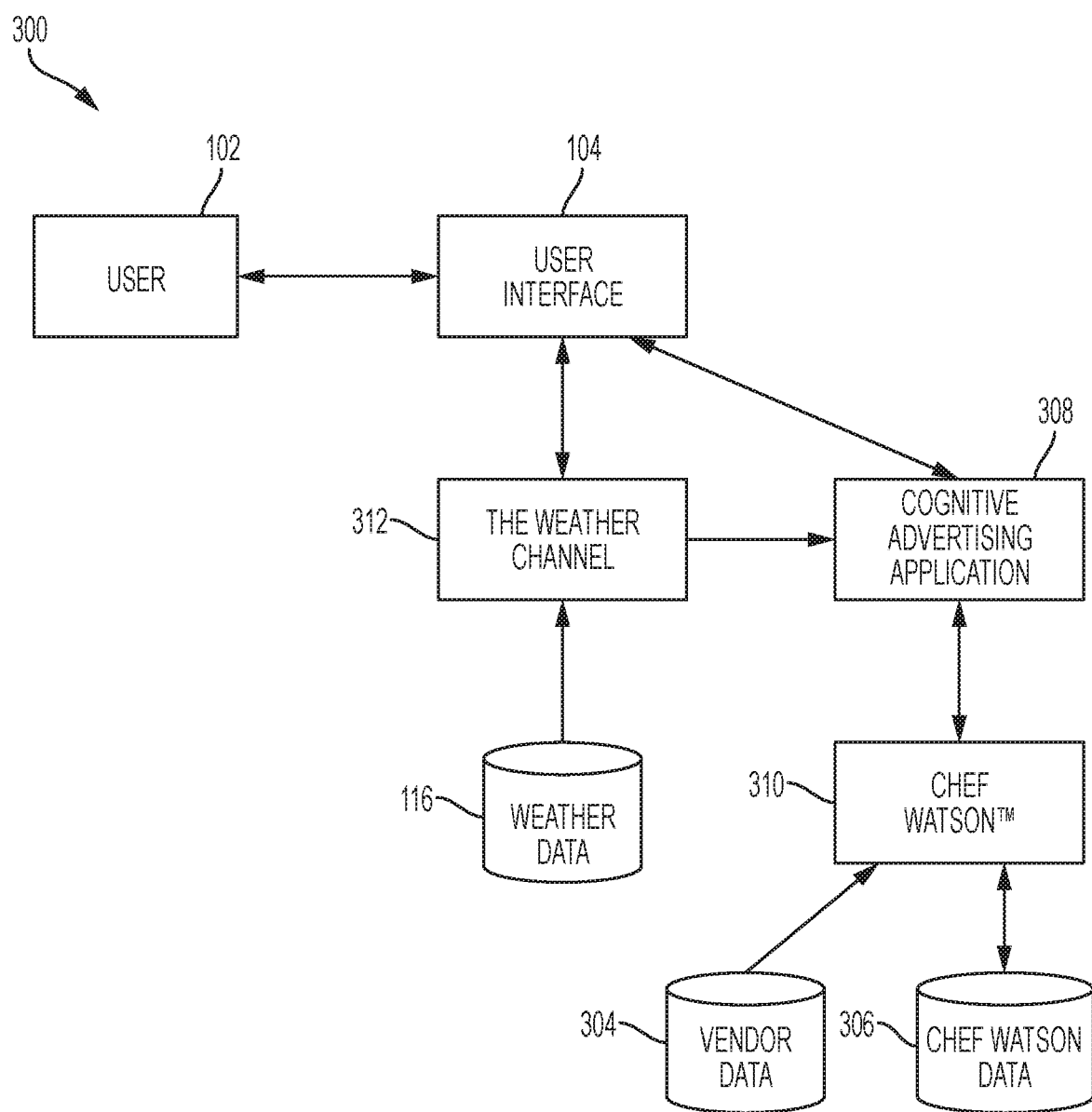
FIG. 3 is a block diagram of a system for implementing cognitive advertising that is triggered by weather data to advertise food products in accordance with one or more embodiments of the invention.

Turning now to FIG. 3, a block diagram 300 of a system for implementing cognitive advertising that is triggered by weather data to advertise food products is generally shown in accordance with one or more embodiments of the invention. The system shown in FIG. 3 can provide real-time, personalized meal planning recommendations that include an advertiser's product for users on the go. One or more embodiments of the invention described herein can provide personalized recipe recommendations that range from simple standards to entirely new dishes and ingredient combinations.

As shown in FIG. 3, data and processing capabilities of a weather data source, such as The Weather Channel 312, and a recipe generator, such as Chef Watson 310, are paired together with vendor data 304 about a food brand(s) being advertised by a vendor to generate recipe recommendations for a target consumer based on weather, time of day, location, and preferred ingredients.

In accordance with one or more embodiments of the invention, Chef Watson 310 combines the knowledge learned to date of Western cuisine with a client recipe database which can make up all or a subset of the vendor data 304 shown in FIG. 3. The Chef Watson knowledge learned to date is shown in FIG. 3 as Chef Watson data 306. Chef Watson can use the client recipe database along with its knowledge learned to date to create entirely new and enhanced client-centric recipes. These new recipes can be used to augment the Chef Watson data 306 and/or the vendor data 304. In accordance with one or more embodiments of the invention, a new cognitive advertising experience is provided by the cognitive advertising application 308 to the user 102, or target consumer. As shown in FIG. 3, the user 102 enters, via the user interface 104 of the cognitive advertising application 308, desired ingredients as a request to Chef Watson 310.

Chef Watson 310 accepts the user request and cognitively combines all the learned pairing knowledge and statistical knowledge, contained in the Chef Watson data 306, with the provided user input along with any previously learned user or vendor constraints contained, for example, in the vendor data 304. In accordance with one or more embodiments of the invention, the previously learned user constraints include weather data 116 associated with the user 102. Based on this information, Chef Watson 310 crafts and outputs new flavor pairings and recipes that include the vendor's products, and then presents them to the target consumer via the cognitive advertising application 308 and the user interface 104.

In accordance with one or more embodiments of the invention, Chef Watson 310 continues to learn, adapt, and evolve the recipe database and user offerings. As shown in FIG. 3, the user interface 104 presented to the user 102 contains components from both The Weather Channel 312 and the cognitive advertising application 308. In accordance with one or more embodiments of the invention described herein, the user 102 is using The Weather Channel 312 via the user interface 104 and content of the user interfaces of advertisements generated by the cognitive advertising application 308 are overlaid in locations specified by The Weather Channel 312.

Chef Watson 310 models food ingredients, dishes, and cuisines. A large number of candidate recipes are produced that match the user's explicit query (if any) and contextual attributes such as, but not limited to: time of year, weather conditions, and time of day. This list of candidate recipes is subjected to a sequence of evaluators to rank the candidate recipes along various dimensions. In accordance with one or more embodiments of the invention, new evaluators are created to ensure that brand-promoted products are included, and to judge whether the recipe includes seasonally-relevant and weather-relevant elements. A score aggregation process incorporates these novel scorers with existing Chef Watson techniques to create a final ranking. This score combination process can be hand-tuned or can be trained based on user signal such as click-through rates. In accordance with one or more embodiments of the invention described herein, the front-end code for a cognitive ad, running for example in SWVL, collects all required attributes (e.g., the user's location and outside temperature, and the brand being promoted on the ad) and passes them to the Chef Watson logic when sending a request.

In accordance with one or more embodiments of the invention, all or a portion of the user interface 104, the Weather Channel 312, the weather data 116, the cognitive advertising application 308, Chef Watson 310, the vendor data 304, and the Chef Watson data 306 are communicatively coupled as shown in FIG. 3 via one or more networks.

Turning now to FIGS. 4-8, examples of graphical user interface screens that can be implemented to advertise food products in an interactive manner are generally shown in accordance with one or more embodiments of the invention. The graphical user interface screens shown in these figures can be displayed, for example via user interface 104 and generated by cognitive advertising application 308 using Chef Watson as a backend system. In accordance with one or more embodiments of the invention, the graphical user interface screens are presented to a target consumer who is using The Weather Channel 312. The graphical user interface screens shown in FIGS. 4-8 are intended to show one example of how a target consumer can interact with one or more embodiments of the invention and example content of that interaction. It is not intended to limiting as many other interactions and content can be produced by exemplary embodiments of the invention described herein.

Figure 4:
FIG. 4 is a block diagram of a graphical user interface screen for implementing cognitive advertising that is triggered by weather data to advertise food products in accordance with one or more embodiments of the invention.

Turning now to FIG. 4, a block diagram 400 of a graphical user interface screen for implementing cognitive advertising that is triggered by weather data to advertise food products is generally shown in accordance with one or more embodiments of the invention. As shown in FIG. 4, the current location (i.e., Chicago), the current weather (i.e., cloudy), and a product of a brand being advertised (i.e., Soup from Brand X Kitchen) are known by the cognitive advertising application. As shown in FIG. 4, an offer to use Chef Watson is presented to the target consumer by the advertiser.

Figure 5:
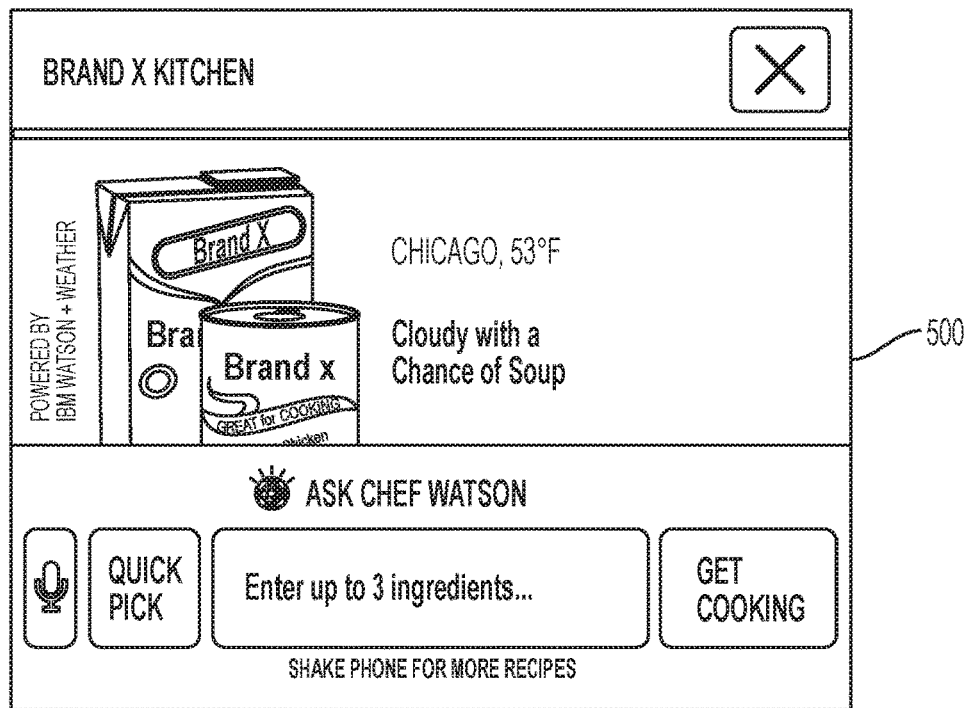
FIG. 5 is a block diagram of a graphical user interface screen for implementing cognitive advertising that is triggered by weather data to advertise food products in accordance with one or more embodiments of the invention.

Turning now to FIG. 5, a block diagram 500 of a graphical user interface screen for implementing cognitive advertising that is triggered by weather data to advertise food products is generally shown in accordance with one or more embodiments of the invention. FIG. 5 can be presented to the target consumer in response to the target consumer selecting the Chef Watson option in FIG. 4. As shown in FIG. 5, the target consumer is prompted to enter up to three ingredients (e.g., ingredients they prefer and/or already have on hand) and given a "quick pick" option. In addition, the target consumer is given the option to take a haptic action (shaking the phone) to get recipes to display. In accordance with one more embodiments of the invention, these recipes that are identified or generated by Chef Watson will include (e.g., as a main ingredient) one or more products of Brand X Kitchen and will be appropriate for a rainy day (e.g., may not include outdoor cooking).

Figure 6:
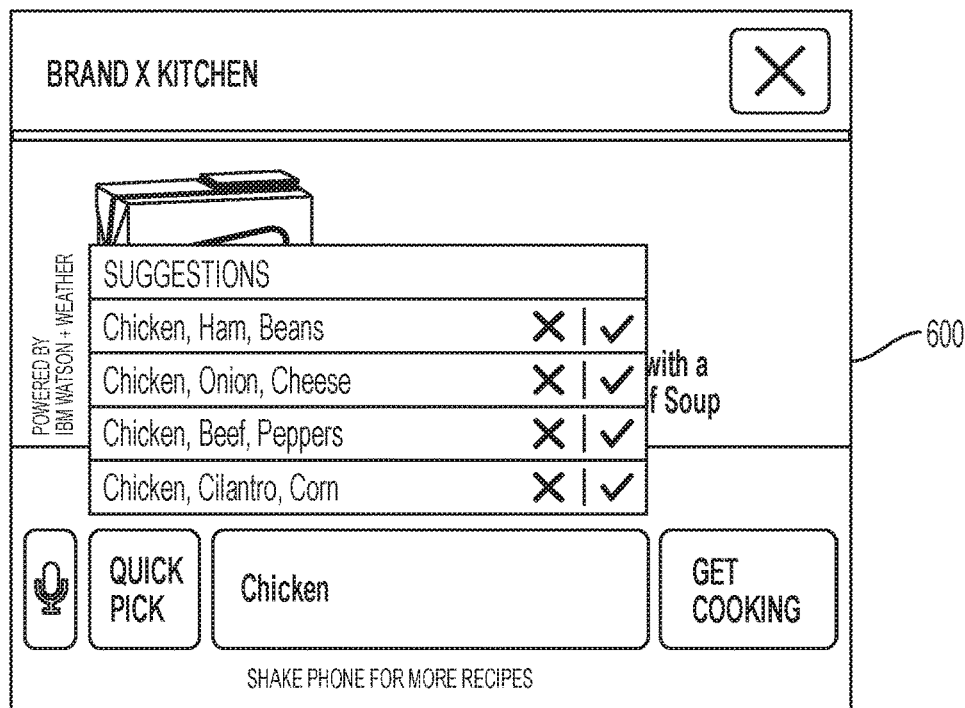
FIG. 6 is a block diagram of a graphical user interface screen for implementing cognitive advertising that is triggered by weather data to advertise food products in accordance with one or more embodiments of the invention.

Turning now to FIG. 6, a block diagram 600 of a graphical user interface screen for implementing cognitive advertising that is triggered by weather data to advertise food products is generally shown in accordance with one or more embodiments of the invention. FIG. 6 can be presented to the target consumer in response to the target consumer selecting the quick pick option in FIG. 5. As shown in FIG. 6, the target consumer is provided with a list of ingredients and prompted to select them.

Figure 7:
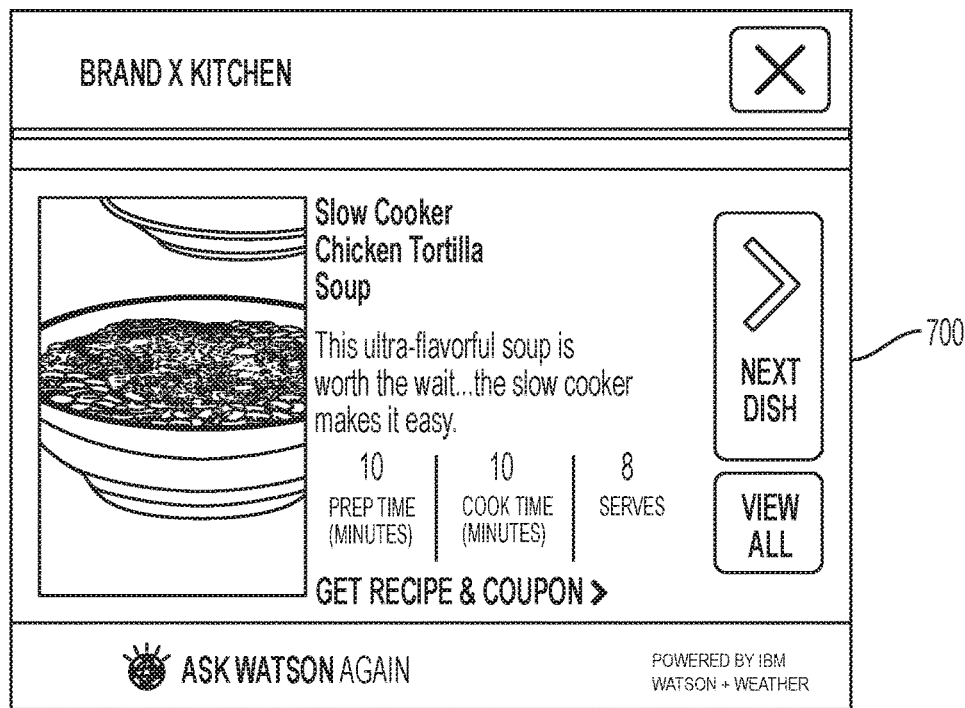
FIG. 7 is a block diagram of a graphical user interface screen for implementing cognitive advertising that is triggered by weather data to advertise food products in accordance with one or more embodiments of the invention.

Turning now to FIG. 7, a block diagram 700 of a graphical user interface screen for implementing cognitive advertising that is triggered by weather data to advertise food products is generally shown in accordance with one or more embodiments of the invention. FIG. 7 can be presented to the target consumer in response to the target consumer selecting ingredients. As shown in FIG. 7, the target consumer is provided with information about a recipe, as well as given an option to go a different recipe or to get a coupon.

Figure 8:
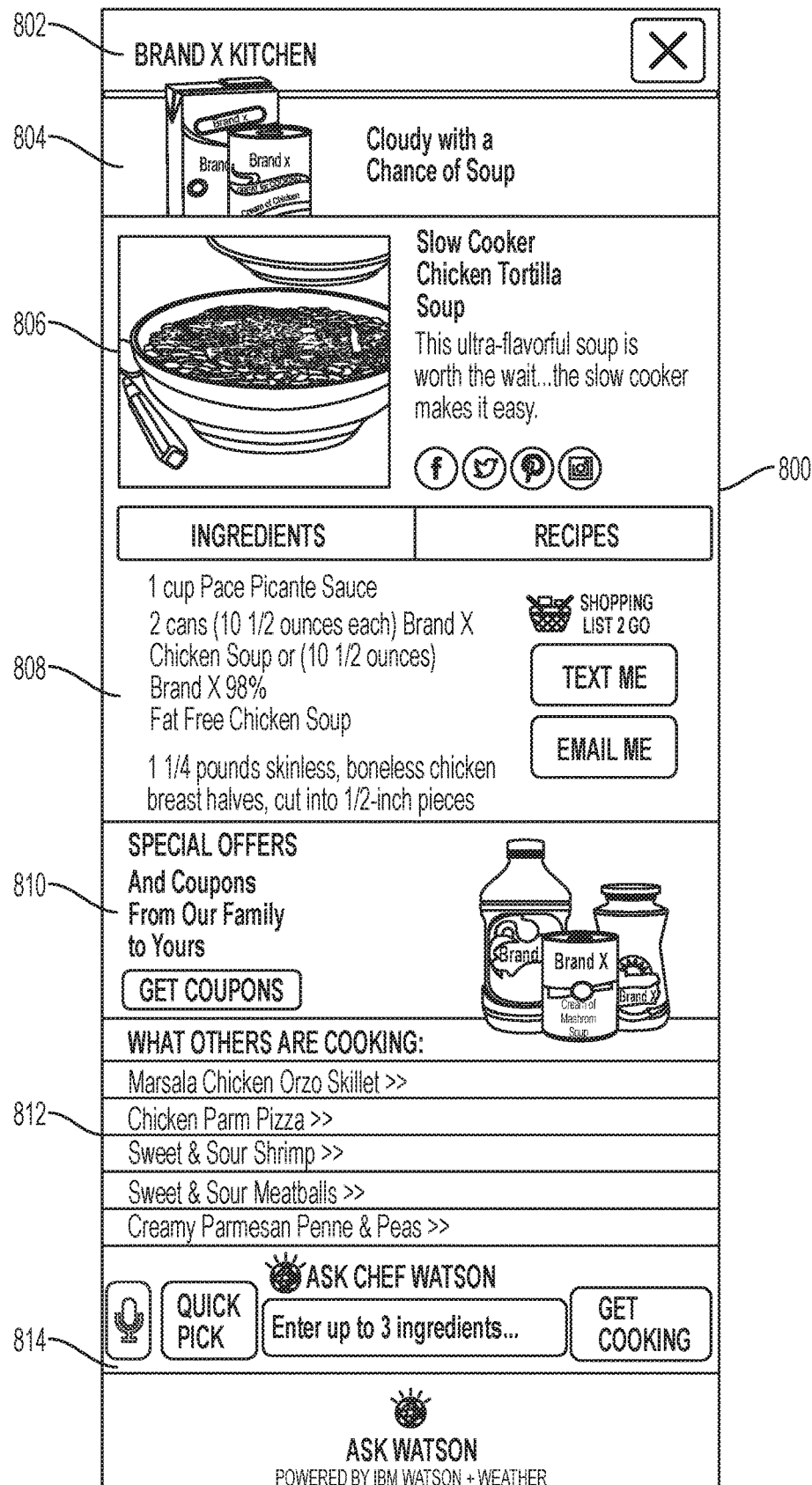
FIG. 8 is a block diagram of a graphical user interface screen for implementing cognitive advertising that is triggered by weather data to advertise food products in accordance with one or more embodiments of the invention.

Turning now to FIG. 8, a block diagram 800 of a graphical user interface screen for implementing cognitive advertising that is triggered by weather data to advertise food products is generally shown in accordance with one or more embodiments of the invention. FIG. 8 can be presented to the target consumer in response to the target consumer selecting a recipe in FIG. 7. The graphical user interface screen shown in FIG. 8 includes a brand portion 802 that displays the name of the advertiser, a product portion 804 that display one or more products, a recipe description portion 806 that describes the recipe, an ingredient list portion 808 that lists ingredients in recipe, a coupon portion 810 that offers coupons promotions and e-commerce, a social media portion 812 that lists recipes being selected by other users and a link to the recipes, and a Chef Watson portion 814 that restarts the recipe selection process. As shown in the ingredient list portion 808 and the social media portion 812, one or more embodiments of the invention are integrated with text, electronic mail, and social media. FIG. 8 depicts one example of some of the types of information that can be presented to the target customer and an example format, and is not intended to be limiting as any type of information that can be accessed by the cognitive advertising application and any type of user interface to present the information to the target consumer can be utilized by one or more embodiments of the invention described herein.

Figure 9:
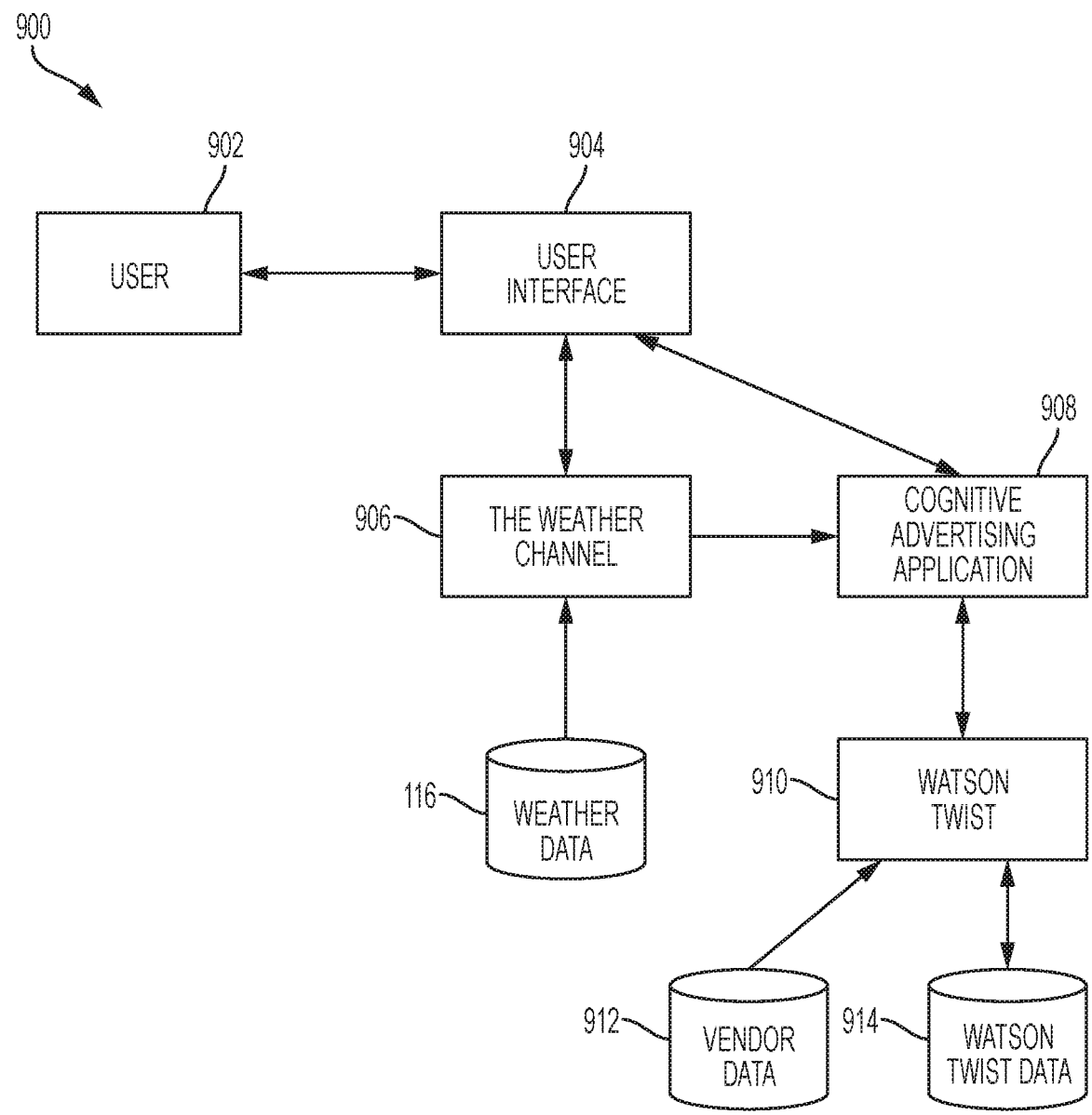
FIG. 9 is a block diagram of a system for implementing cognitive advertising that is triggered by weather data to advertise drink products in accordance with one or more embodiments of the invention.

Turning now to FIG. 9, a block diagram 900 of a system for implementing cognitive advertising that is triggered by weather data to advertise drink products is generally shown in accordance with one or more embodiments of the invention. The system shown in FIG. 9 can provide real-time, personalized beverage planning recommendations and solutions to target consumers. One or more embodiments of the invention described herein can provide personalized drink recipe recommendations that range from simple standards to entirely new drinks and ingredient combinations.

As shown in FIG. 9, data and processing capabilities of a weather data source such as The Weather Channel 906 and a beverage recipe generator such as Watson Twist 910, are paired together with vendor data 912 about a beverage brand(s) being advertised by a vendor to generate beverage recipe recommendations for a target consumer based on weather, time of day, location, and preferred ingredients.

In accordance with one or more embodiments of the invention Watson Twist 910 combines its knowledge of thousands of recipes and its learned mastery of the science of aroma and flavor at the molecular level with a vendor recipe database which can make up all or a subset of the vendor data 912 shown in FIG. 9. The Watson Twist knowledge learned to date is shown in FIG. 9 as Watson Twist data 914. Watson Twist can use the client recipe database along with its knowledge learned to date and apply it to the task of mixing flavors to put new twists on classic cocktails (or other beverages) and/or to create entirely new and enhanced client-centric beverage recipes. These new beverage recipes can be used to augment the Watson Twist data 914 and/or the vendor data 912. In accordance with one or more embodiments of the invention, a new cognitive advertising experience is provided by the cognitive advertising application 908 to the user 902, or target consumer. As shown in FIG. 9, the user 902 enters, via the user interface 904 and the cognitive advertising application 908, desired ingredients and/or flavors as a request to Watson Twist 910.

Watson Twist 910 ingests the user request and cognitively combines all the learned pairing knowledge and statistical knowledge, contained in the Watson Twist data 914, with the provided user input along with any previously learned user or vendor constraints, contained for example in the vendor data 912. In accordance with one or more embodiments of the invention, the previously learned user constraints include weather data 116 associated with the user 902. Based on this information, Watson Twist 910 crafts and outputs new flavor pairings and drink recipes that include the vendor's products, and then presents them to the target consumer, or user 902, via the cognitive advertising application 908 and the user interface 904. In accordance with one or more embodiments of the invention, Watson Twist 910 continues to learn, adapt, and evolve the recipe database and user offerings. As shown in FIG. 9, the user interface 904 presented to the user 902 contains components from both The Weather Channel 906 and the cognitive advertising application 908. In accordance with one or more embodiments of the invention described herein, the user 902 is using The Weather Channel 906 via the user interface 904 and content of the user interfaces of advertisements generated by the cognitive advertising application 908 are overlaid in locations specified by The Weather Channel 906.

Similar to the processing described above with respect to Chef Watson 310, a large number of candidate drink recipes are produced by Watson Twist 910 that match the user's explicit query (if any) and contextual attributes such as, but not limited to: time of year, weather conditions, and time of day. This list of candidate drink recipes is subjected to a sequence of evaluators to rank the candidate drink recipes along various dimensions. In accordance with one or more embodiments of the invention, new evaluators are created to ensure that brand-promoted products are included, and to judge whether the drink recipe includes seasonally-relevant and weather-relevant elements. A score aggregation process incorporates these novel scorers with existing Watson Twist techniques to create a final ranking. This score combination process can be hand-tuned or can be trained based on user signal such as click-through rates. In accordance with one or more embodiments of the invention described herein, the front-end code for a cognitive ad, running for example in SWVL, collects all required attributes (e.g., the user's location and outside temperature, and the brand being promoted on the ad) and passes them to the Chef Watson logic when sending a request.

It should be noted that a recipe generated by Chef Watson or Watson Twist can take several forms. Depending on the target audience the recipe can be just a combination of three or four ingredients provided to inspire the users (who may then create their own full recipe based on that), it can be a full list of ingredients, or it can be a list of ingredients with proportions, plus recipe instructions.

Figure 10:
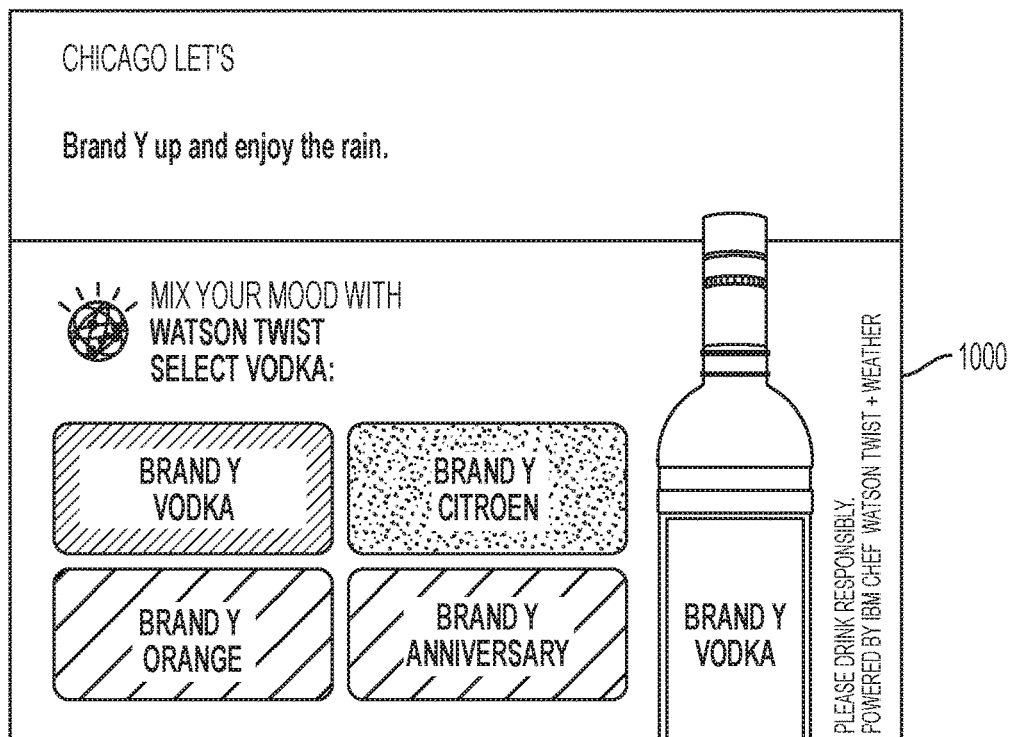
FIG. 10 is a block diagram of a graphical user interface screen for implementing cognitive advertising that is triggered by weather data to advertise drink products in accordance with one or more embodiments of the invention.
Figure 11:
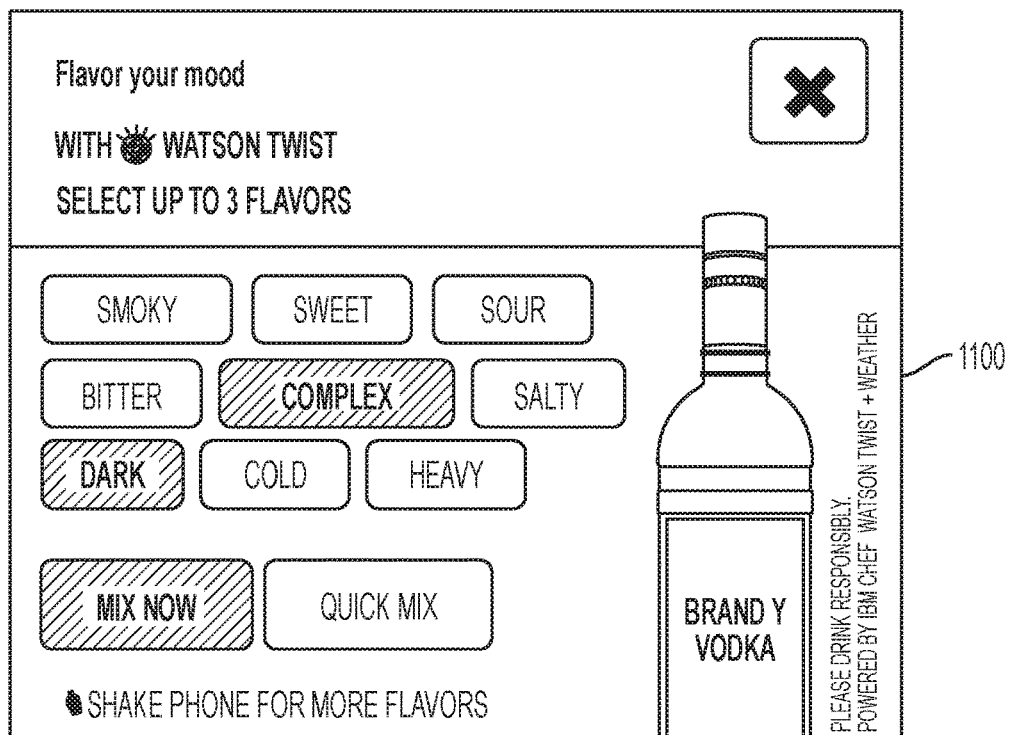
FIG. 11 is a block diagram of a graphical user interface screen for implementing cognitive advertising that is triggered by weather data to advertise drink products in accordance with one or more embodiments of the invention.
Figure 12:
FIG. 12 is a block diagram of a graphical user interface screen for implementing cognitive advertising that is triggered by weather data to advertise drink products in accordance with one or more embodiments of the invention.

Turning now to FIGS. 10-12, examples of graphical user interfaces that can be implemented to advertise beverage products in an interactive manner are generally shown in accordance with one or more embodiments of the invention. The graphical user interfaces shown in these figures can be displayed, for example via user interface 904 and generated by cognitive advertising application 908 using Watson Twist as a backend system. In accordance with one or more embodiments of the invention, the graphical user interfaces are presented to a target consumer who is using The Weather Channel 906. The graphical user interface screens shown in FIGS. 10-12 are intended to show one example of how a target consumer can interact with one or more embodiments of the invention and example content of that interaction. It is not intended to be limiting as many other interactions and content can be produced by exemplary embodiments of the invention described herein.

Turning now to FIG. 10, a block diagram 1000 of a graphical user interface screen for implementing cognitive advertising that is triggered by weather data to advertise drink products is generally shown in accordance with one or more embodiments of the invention. As shown in FIG. 10, the current location (i.e., Chicago), the current weather (i.e., rain), a product of a brand being advertised are known by the cognitive advertising application (i.e., vodka from Brand Y) are known by the cognitive advertising application. As shown in FIG. 10, an offer to use Watson Twist is presented to the target consumer by the advertiser. Also shown on the graphical user interface screen of FIG. 10 is a request to select a type of vodka from Brand Y.

Turning now to FIG. 11, a block diagram 1100 of a graphical user interface screen for implementing cognitive advertising that is triggered by weather data to advertise drink products is generally shown in accordance with one or more embodiments of the invention. The user is presented with a variety of flavor profiles for selection, and given the option to shake the user device (e.g., the phone) for more flavors.

Turning now to FIG. 12, a block diagram 1200 of a graphical user interface screen for implementing cognitive advertising that is triggered by weather data to advertise drink products is generally shown in accordance with one or more embodiments of the invention. As shown in FIG. 12, based on the flavor profile(s) entered by the user, a particular beverage product sold by the vendor is suggested for the user. Based on the user selecting a particular product and requesting a recipe, the cognitive advertising application can display a message having to do with the weather data (e.g., "spice up your rainy evening with product A") and/or present the user with a drink recipe that uses the selected product. In accordance with one or more embodiments of the invention, Watson Twist makes drink recipe recommendations based on existing recipes or newly created recipes. The user can request a text or email that contains the list of ingredients included in a drink recipe. A store locator function can also be provided based on a current geographic location of the target consumer. In addition, the user can be presented with an option of using Chef Watson to pair a food recipe with a beverage recipe.

Figure 13:
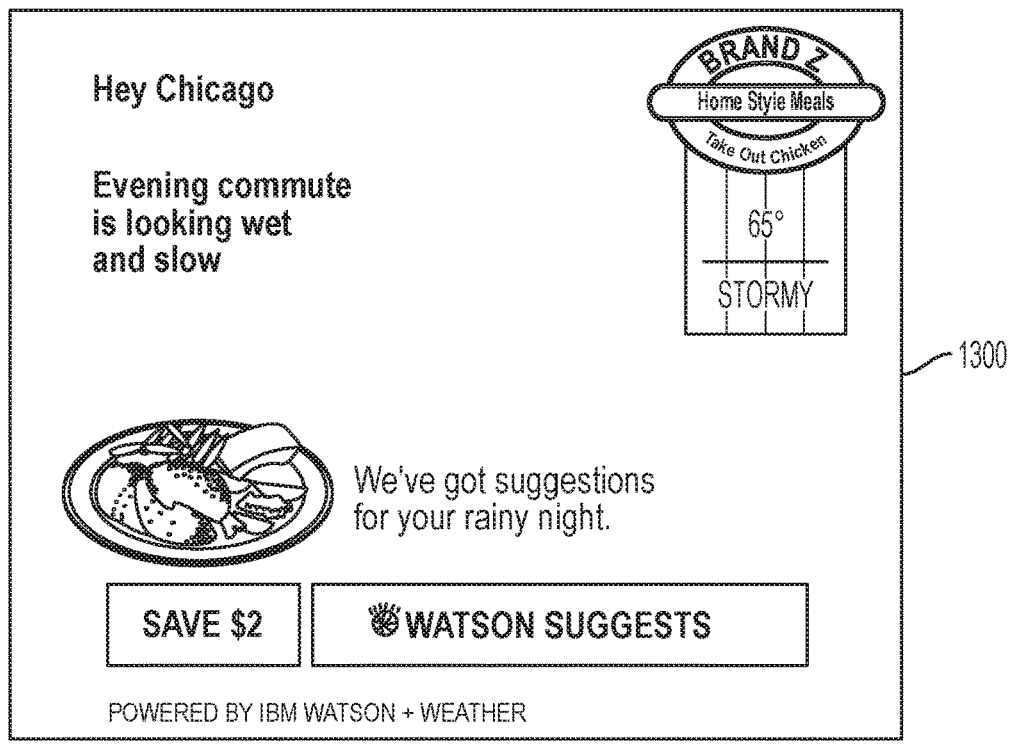
FIG. 13 is a block diagram of a graphical user interface screen for implementing cognitive advertising that is triggered by weather data to advertise a restaurant in accordance with one or more embodiments of the invention.
Figure 14:
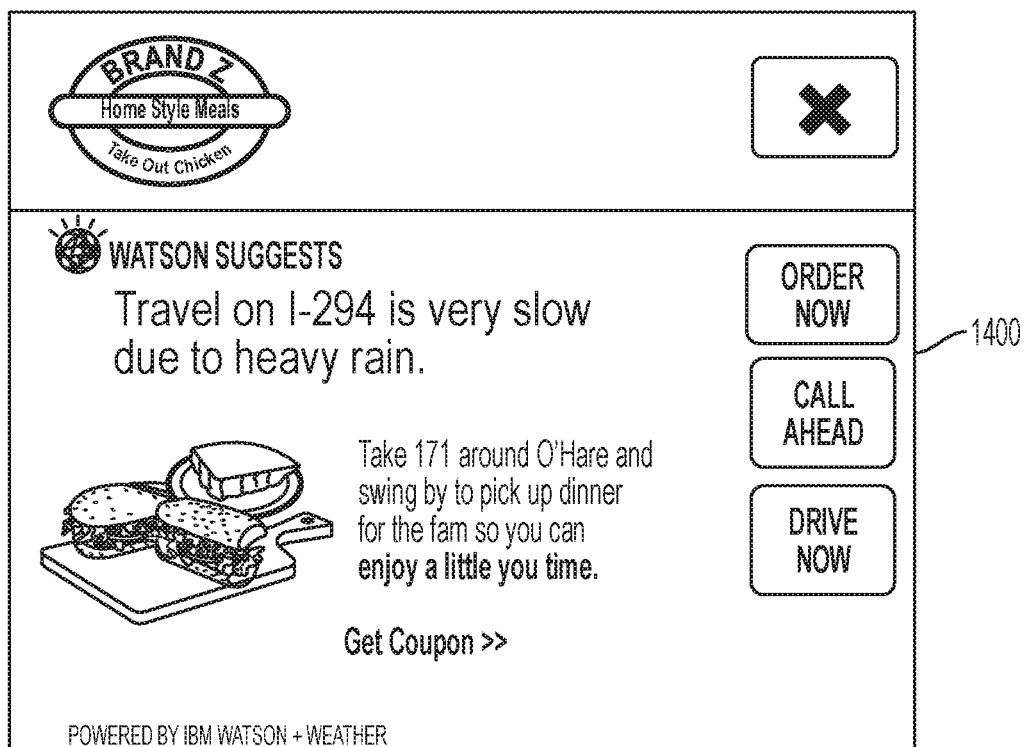
FIG. 14 is a block diagram of a graphical user interface screen for implementing cognitive advertising that is triggered by weather data to advertise a restaurant in accordance with one or more embodiments of the invention.

Turning now to FIGS. 13-14, examples of graphical user interfaces that can be implemented to advertise a service (e.g., a restaurant) in an interactive manner are generally shown in accordance with one or more embodiments of the invention. Turning now to FIG. 13, a block diagram 1300 of a graphical user interface screen for implementing cognitive advertising that is triggered by weather data and current traffic data to advertise a Brand Z restaurant is generally shown in accordance with one or more embodiments of the invention. Turning now to FIG. 14, a block diagram 1400 of a graphical user interface screen for implementing cognitive advertising that is triggered by weather data to advertise a Brand Z restaurant is generally shown in accordance with one or more embodiments of the invention. The graphical user interface screens shown in FIGS. 13-14 are intended to show one example of how a target consumer can interact with one or more embodiments of the invention and example content of that interaction. It is not intended to limiting as many other interactions and content can be produced by exemplary embodiments of the invention described herein.

Figure 15:
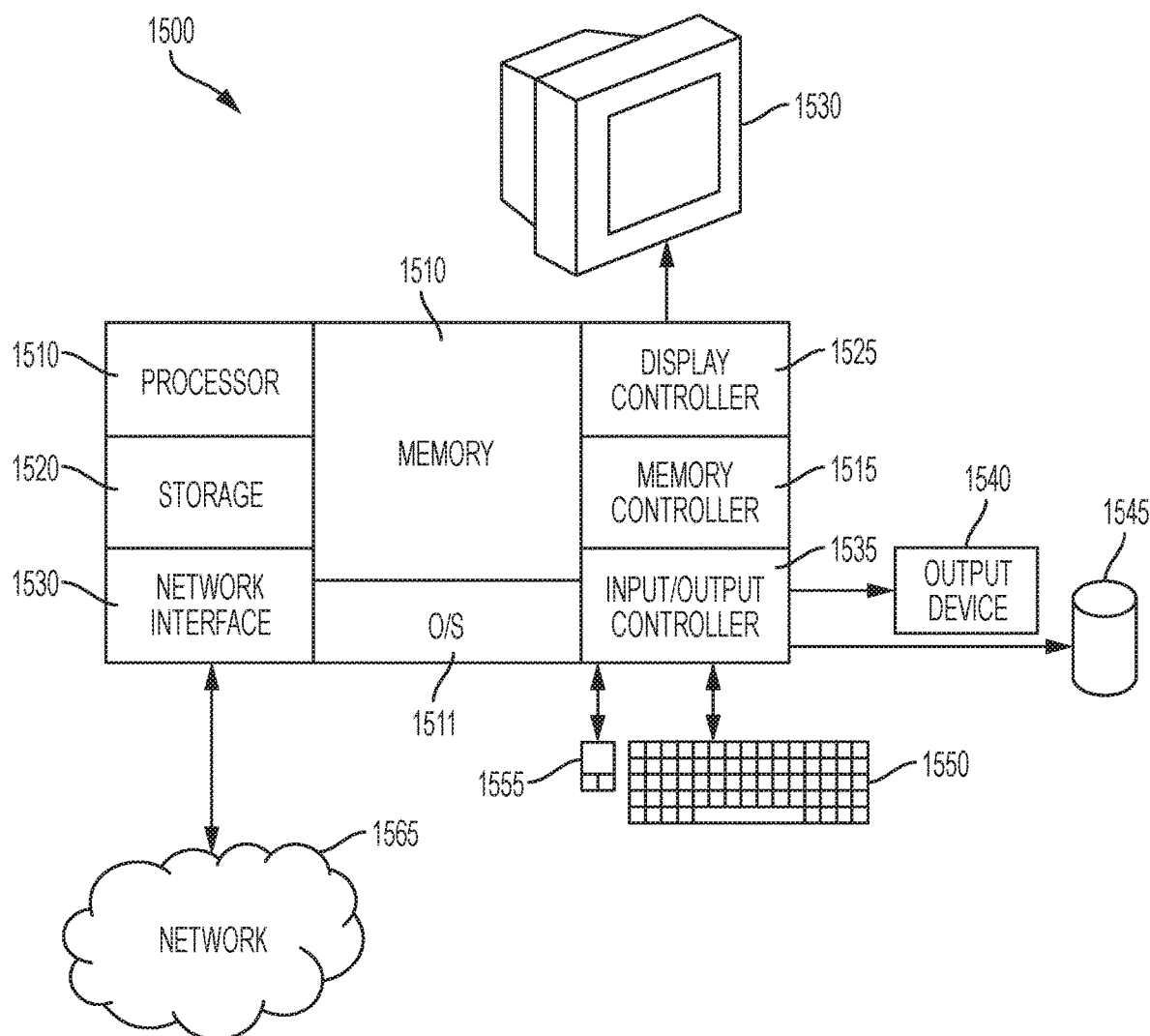
FIG. 15 is a block diagram of a computing device for implementing some or all aspects of a system for implementing cognitive advertising that is triggered by weather data in accordance with one or more embodiments of the invention.

Turning now to FIG. 15, a block diagram of a computer system 1500 for use in implementing some or all aspects of a system for implementing cognitive advertising that is triggered by weather data is generally shown according to one or more embodiments of the invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 1500, such as a mobile device, personal computer, workstation, minicomputer, or mainframe computer.

In an exemplary embodiment, as shown in FIG. 15, the computer system 1500 includes a processor 1505, memory 1510 coupled to a memory controller 1515, and one or more input devices 1545 and/or output devices 1540, such as peripherals, that are communicatively coupled via a local I/O controller 1535. These devices 1540 and 1545 may include, for example, a printer, a scanner, a microphone, and the like. A conventional keyboard 1550 and mouse 1555 may be coupled to the I/O controller 1535. The I/O controller 1535 may be, for example, one or more buses or other wired or wireless connections, as are known in the art. The I/O controller 1535 may have additional elements, which are omitted for simplicity, such as controllers, buffers (caches), drivers, repeaters, and receivers, to enable communications.

The I/O devices 1540, 1545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1505 is a hardware device for executing hardware instructions or software, particularly those stored in memory 1510. The processor 1505 may be a custom made or commercially available processor, a central processing unit (CPU), an auxiliary processor among several processors associated with the computer system 1500, a semiconductor based microprocessor (in the form of a microchip or chip set), a macroprocessor, or other device for executing instructions. The processor 1505 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 1510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1510 may incorporate electronic, magnetic, optical, or other types of storage media. Note that the memory 1510 may have a distributed architecture, where various components are situated remote from one another but may be accessed by the processor 1505.

The instructions in memory 1510 may include one or more separate programs, each of which comprises an ordered listing of executable instructions for implementing logical functions. In the example of FIG. 15, the instructions in the memory 1510 include a suitable operating system (OS) 1511. The operating system 1511 essentially may control the execution of other computer programs and provides scheduling, input-output control, file and data management, memory management, and communication control and related services.

Additional data, including, for example, instructions for the processor 1505 or other retrievable information, may be stored in storage 1520, which may be a storage device such as a hard disk drive or solid state drive. The stored instructions in memory 1510 or in storage 1520 may include those enabling the processor to execute one or more aspects of the dispatch systems and methods of this disclosure.

The computer system 1500 may further include a display controller 1525 coupled to a display 1530. In an exemplary embodiment, the computer system 1500 may further include a network interface 1560 for coupling to a network 1565. The network 1565 may be an IP-based network for communication between the computer system 1500 and an external server, client and the like via a broadband connection. The network 1565 transmits and receives data between the computer system 1500 and external systems. In an exemplary embodiment, the network 1565 may be a managed IP network administered by a service provider. The network 1565 may be implemented in a wireless fashion, e.g., using wireless protocols and technologies, such as WiFi, WiMax, etc. The network 1565 may also be a packet-switched network such as a local area network, wide area network, metropolitan area network, the Internet, or other similar type of network environment. The network 1565 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing cognitive advertising that is triggered by weather data as described herein can be embodied, in whole or in part, in computer program products or in computer systems 1500, such as that illustrated in FIG. 15.

The terminology used herein is for the purpose of describing particular embodiments of the invention only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments of the invention were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, at a processing system, weather data that is associated with a target consumer;
selecting, using the processing system, content of a digital advertisement for a vendor, the selecting based at least in part on;
the weather data that is associated with the target consumer; and
information about an item provided by the vendor;
generating the digital advertisement, the digital advertisement comprising the content, user controls for allowing the target consumer to enter one or both of natural language text and voice input, and an interface between the digital advertisement and a backend cognitive agent;
transmitting the digital advertisement, including the content, for presentation to the target consumer via a user interface;
receiving a response to the digital advertisement from the target consumer, at least a subset of the response entered by the target consumer in one or both of natural language text and voice input;
processing the response by the backend cognitive agent, the processing comprising disambiguating the response;
modifying, using the processing system, the content of the digital advertisement to include at least one recipe chosen from a group of recipes that include the item and based at least in part on output from the backend cognitive agent, wherein the at least one recipe is chosen according to its ranking which is based on one or both of a current season and the weather data that is associated with the target consumer; and
transmitting the digital advertisement, including the modified content, for presentation to the target consumer via the user interface.

2. The computer-implemented method of claim 1, wherein the selecting is further based at least in part on one or both of a current location of the target consumer, and a current time of day.

3. The computer-implemented method of claim 1, wherein the recipe is included in the information about the item provided by the vendor.

4. The computer-implemented method of claim 1, wherein the recipe is generated in real-time by the processing system.

5. The computer-implemented method of claim 1, wherein the response to the digital advertisement is stored and provided to the vendor for analysis.

* * * * *